Nov. 29, 1966  J. LAURENT  3,287,967
WAVE PROPAGATING APPARATUS
Filed Nov. 22, 1963  3 Sheets-Sheet 1

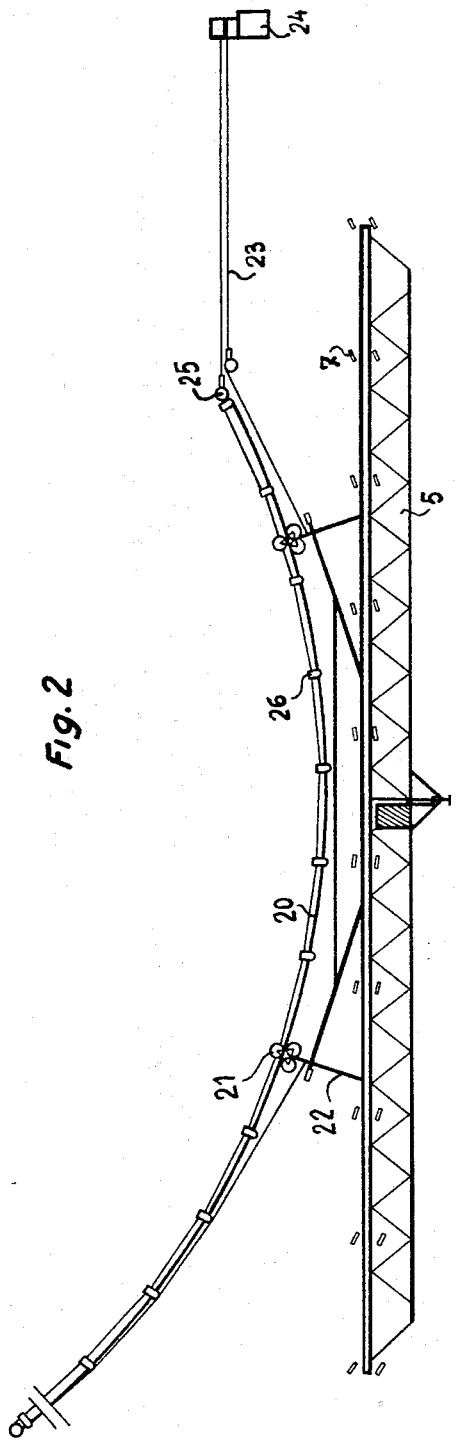

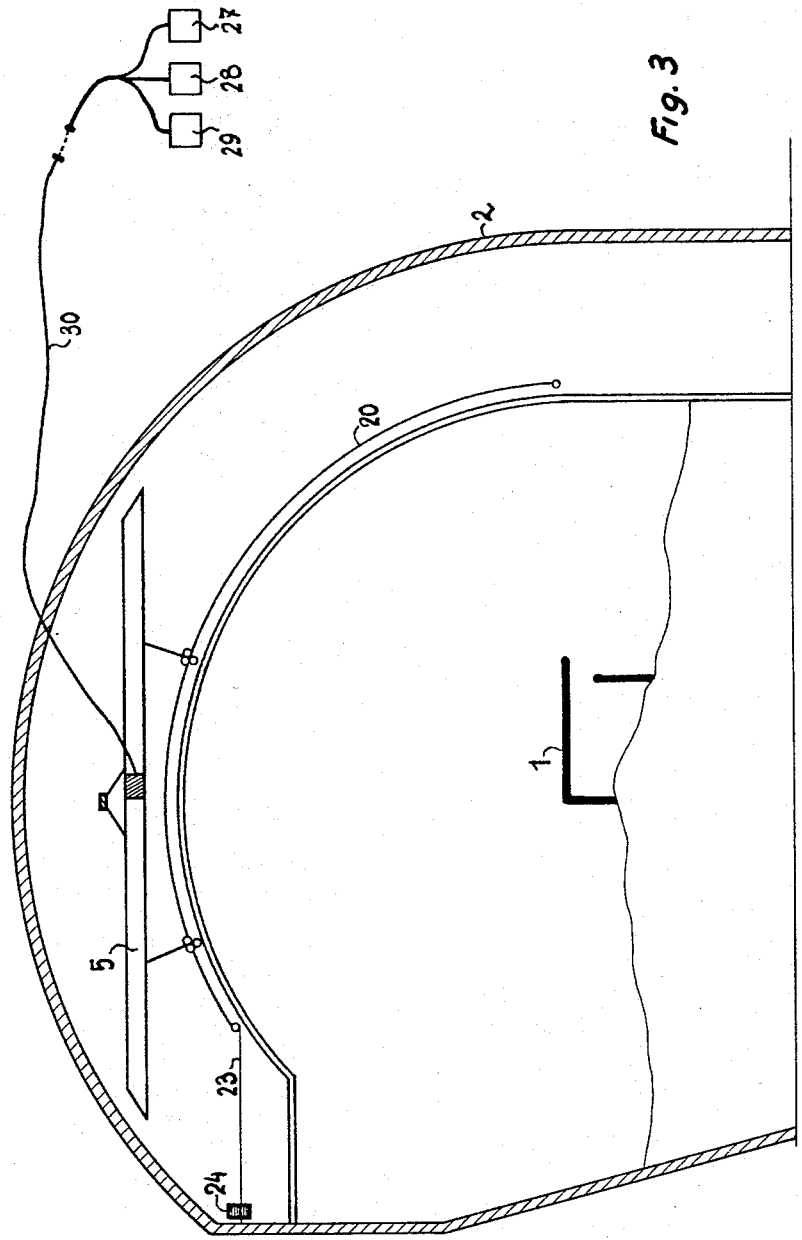

United States Patent Office 3,287,967
Patented Nov. 29, 1966

3,287,967
WAVE PROPAGATING APPARATUS
Jean Laurent, 116 Avenue du General Leclerc,
Paris, France
Filed Nov. 22, 1963, Ser. No. 325,720
Claims priority, application France, Nov. 26, 1962,
916,604
6 Claims. (Cl. 73—148)

This invention relates to wave making machines and has for an object to provide a machine which is flexible in use so as to enable a variety of characteristics of artificially propagated waves to be varied singly or in combination and at will.

Progress in the techniques of testing scale models of marine installations and equipment, especially in investigations of silting and erosion in waterways, necessitates the propagation as a continuous series of artificial waves all the principal characteristics of which (direction, frequency and amplitude) can be changed at any moment according to the requirements of the tests or as a part of a prearranged programme.

Equipment in use up to the present does not permit the achievement of this result, or only permits it with difficulty. In effect, either the equipment is not designed to enable adjustments of wave characteristics to be made while it is operating, or else, if adjustments are provided, too many mechanisms are involved or they are too complicated and heavy, thus rendering their use more difficult and less economic.

The present invention aims at providing means by which it is possible to vary all or some of the characteristics of an artificial wave without the disadvantages noted above.

To this end, an equipment according to the present invention consists primarily of an artificial wave generator mounted on a rigid base or frame which carries an oscillatory wave generator whose orientation relative to the model under test, or the frequency or amplitude of whose oscillations, can be varied as required.

Changes of orientation of the frame are operative to vary the direction of wave propagation by the generator, and the frame may be angularly displaceable relative to the scale model under test in a manner so as to vary the direction of waves propagated by the generator.

Preferably, the frame is constrained to move in a preset curvilinear path about a fixed axis.

Advantageously, the frame runs on rollers and its preset path is determined by a guide element.

Conveniently, the frame carries means for varying the frequency or the amplitude, or both, of the artificial wave propagated.

It is preferred to provide a separate control for the displacement of the frame and for the means for varying the period or amplitude of the wave or both. The characteristics of the artificial wave can be varied together or separately and at any time. As will be understood, the different controls can be manual, electrical, electronic, mechanical or otherwise, and they may be governed by a predetermined law whether periodic or not. The control action may be automatic or not according to requirements.

The frame may be located above the surface of the water—for example, it may be suspended—or it can be submerged to a greater or less extent in the water.

Other features of the invention will become apparent in the course of the following description of one practical application thereof which is given by way of example only with reference to the accompanying drawings in which:

FIGURE 2 is a plan view, and

FIGURE 3 is a schematic plan of an installation embodying the invention for testing scale models.

Throughout the drawings, the same parts are identified by the same reference numerals.

Figure 1:
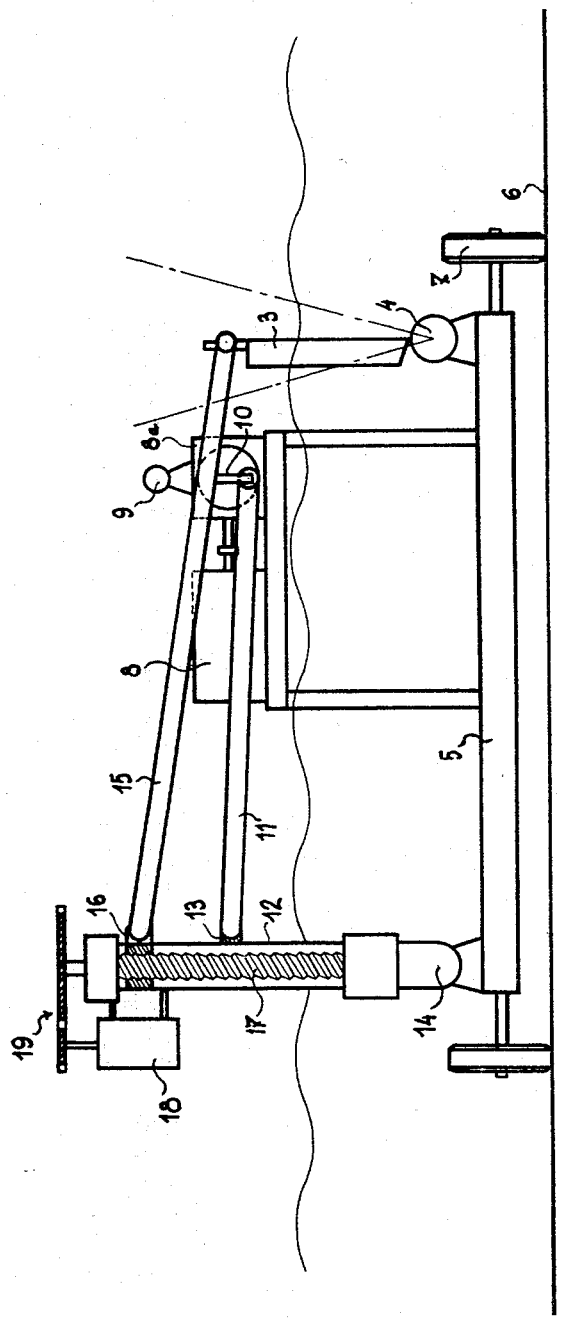
FIGURE 1 is a part-sectional elevation of the apparatus.

Artificial waves are propagated for the testing of a scale model 1 in a water tank 2 (FIGURE 3) by a wave generator which consists essentially of a vane or paddle 3 capable of oscillation about an axis 4 under the control of a mechanism described in greater detail below. The generator is mounted on a rigid frame 5 immersed in the tank 2. The bottom 6 of the tank is a flat horizontal surface on which the frame 5 is carried by rollers 7.

Means mounted on the frame 5 for oscillating the paddle 3 consists of an electric motor 8 and reduction gear 8a forming a variable speed unit. The motor speed can be varied, for example, by varying the voltage applied to it by a thyraton (not shown) coupled to a potentiometer (also not shown) for controlling the grid voltage. The reduction gear 8a drives mechanically a second circular potentiometer 9 across whose terminals appears a voltage which varies in dependence on a law whose periodicity is adjustable.

The motor and reduction gear unit drive a crank or eccentric sheave indicated at 10 to which is coupled a connecting rod 11 which controls a slideway 12 to which it is attached at a fixed point 13. The slideway can oscillate about an axis 14. A lever 15 oscillates the paddle 3 and is pinned to a nut 16 slidable in the slideway 12. The position of the nut 16 lengthwise of the slideway is governed by a feed screw 17 driven by an auxiliary motor 18 through a conventional reduction gear indicated at 19.

The frame 5 thus carries an artificial wave generator whose wave frequency can be controlled by means of the units 8, 8a and whose wave amplitude can be controlled by the auxiliary motor 18.

The frame 5 is seen in plan in FIGURE 2, which also shows the means for controlling the displacement of the frame in order to adjust the direction of propagation of the artificial waves relative to a datum position of the model 1. The frame is constrained to move in a path defined by a rigid guide element in the form of a circular rail 20 fixed on the bottom 6 of the model tank. Rollers 21 carried on arms 22 secured to the frame 5 bear on the opposite sides of the rail 20. As shown in FIGURE 2, the support arms 22 of rollers 7 on which the frame runs on the bottom of the tank are inclined so that the frame naturally tends to move in an arcuate path comprising the arc of a circle concentric with the rail 20 when changing its orientation relative to the model 1.

In the form of the invention illustrated, displacement of the frame is achieved by means of a cable 23 operated by a conventional drive or winding gear 24. The ends of the cable 23 are fixed to two points on the frame (as shown, on the arms 22) and the cable is engaged by pulleys or guides indicated at 25, 26 respectively so as to follow a polygonal course closely approximating to an arc of a circle concentric with the rail 20.

The assembly shown in FIGURES 1 and 2 is located in a test tank in the manner illustrated in FIGURE 3. This latter figure also shows the several controllers 27, 28, 29 for the apparatus. The controller for the electric power supply to the motor and reduction gear unit 8, 8a is shown schematically at 27. This controller is preferably provided with an electronic unit for enabling the speed of the motor to be controlled either manually or in accordance with a given law—for example, a frequency variation which is a function of the voltage variations developed across the terminals of the potentiometer 9.

The controller 28 governs the auxiliary motor 18 and may be either manual or a conventional electromechanical servo system or any other form for controlling as desired the motion of the nut 16 which is coupled to the link 15. A similar controller 29 controls the cable winder 24 governing the displacement of the frame 5. A multicore flexible cable 30 connects the remote controllers 27, 28, 29 to the corresponding frame-mounted mechanisms and the fixed winding gear 24.

The controllers 27, 28, 29 are thus operative to vary separately, or in any desired combination, the three principal characteristics of wave propagation by the oscillatory vane or paddle 3 comprising the components of frequency and amplitude of oscillation of the vane or paddle and the direction of wave propagation, respectively.

What is claimed is:

1. A wave propagating apparatus comprising a rigid frame; means for supporting said frame for displacement in relation to a datum position of a model under test; rigid guide means fixed relative to said datum position; an operative connection between said frame and said guide means for controlling the path of said frame displacement; means for traversing said frame along said path; an oscillatory paddle mounted for oscillation about a fixed axis in said frame; a linkage for oscillating said paddle; a first motor coupled to said linkage for determining the frequency of oscillation of said paddle; a second motor coupled to said linkage for determining the amplitude of said oscillation; a third motor for displacing said frame; and means for controlling at least one of said motors.

2. A wave propagating apparatus for use in propagating waves in a body of water comprising, an oscillating wave generator for propagating waves in said body of water, movable mount means mounting said wave generator for movement and travel in said body of water, control means associated with said wave generator for selectively, variably controlling the frequency, the amplitude and the direction of propagation of said waves, said movable means comprising a travelling mount, guide means to guide movement of said mount along a selected path, comprising means for constraining travel of said mount means mounting said wave generator for travel along an arcuate path, said guide means comprising arcuate rail means, and connection means connecting said mount means for travel along said rail.

3. A wave propagating apparatus according to claim 2, in which said mount means includes a travelling frame, and in which said connection means comprises arms extending from said frame, and rollers arranged on said arms for travelling on said rail means.

4. A wave propagating apparatus according to claim 2, in which said wave generator comprises an oscillatory element, and in which said control means comprise driven linkage means for oscillating said element, a first motor driving said linkage means, and means comprising a second motor for modifying the effective length of said linkage means.

5. A wave propagating apparatus according to claim 4, in which said mount means comprises a travelling frame, said linkage means including an upright pivotal slideway pivoted on said frame, a link pivotally secured to said oscillatory element and adjustably engaged to said slideway, connections to said first motor to pivot said slideway, and connections to said second motor to move said link upwardly and downwardly on said upright slideway.

6. A wave propagating apparatus comprising a rigid frame, means for determining the orientation of said frame, an oscillatory wave generator mounted on said frame and comprising a paddle oscillatably mounted on said frame, a linkage for oscillating said paddle, a first motor operative on said linkage for determining the frequency of oscillation of said paddle, a second motor operative on said linkage for determining the amplitude of oscillation of said paddle, means for controlling the action of at least one of said motors, said linkage comprising an elongated slideway pivotally mounted on said frame and capable of swinging about a fixed pivotal axis perpendicular to the direction of length of said slideway, a driving connection between said slideway and said first motor, a link pivoted to said paddle and adjustably engageable with said slideway, and a driving connection between said link and said second motor for controlling the position of said engagement.

References Cited by the Examiner
UNITED STATES PATENTS

| 813,413 | 2/1906 | Ford | 73—148 |
|---|---|---|---|
| 2,002,043 | 5/1935 | Price | 4—172 |
| 3,005,207 | 10/1961 | Matrai | 73—148 X |
| 3,109,304 | 11/1963 | Hunziker | 73—148 X |

DAVID SCHONBERG, *Primary Examiner.*